United States Patent [19]

Endo et al.

[11] Patent Number: 4,771,337
[45] Date of Patent: Sep. 13, 1988

[54] IMAGE RECORDING APPARATUS

[75] Inventors: Yutaka Endo, Yokohama; Shigeo Takenaka, Kamakura, both of Japan

[73] Assignee: Canon Kabushiki Kaisha, Tokyo, Japan

[21] Appl. No.: 799,020

[22] Filed: Nov. 18, 1985

[30] Foreign Application Priority Data

Nov. 20, 1984 [JP] Japan .................. 59-245688
Nov. 26, 1984 [JP] Japan .................. 59-249038

[51] Int. Cl.$^4$ ............................................ H04N 1/04
[52] U.S. Cl. ................... 358/285; 358/293; 358/280; 358/300
[58] Field of Search ............... 358/300, 256, 285, 293, 358/280

[56] References Cited

U.S. PATENT DOCUMENTS 4,059,833 11/1977 Kitamura et al. ............... 358/285

Primary Examiner—Edward L. Coles, Sr.
Attorney, Agent, or Firm—Fitzpatrick, Cella, Harper & Scinto

[57] ABSTRACT

An image recording apparatus includes a frame memory for storing image information, a recording light source, a light modulator activated by the image signal stored in the frame memory for modulating a light emitted from the recording light source in a recording mode, a light scanning device, and a light shut-off device separate from the light modulator for shutting off the light emitted from the recording light source in a non-recording mode.

15 Claims, 3 Drawing Sheets

IMAGE RECORDING APPARATUS

BACKGROUND OF THE INVENTION

1. Field of the Invention

The present invention relates to an image recording apparatus which prevents light exposure to a record area and non-record area on a photo-sensitive sheet when one or more image are recorded on one photo-sensitive sheet by a light modulated with an image signal.

2. Description of the Prior Art

A conventional apparatus of this type is shown in FIG. 1. A light output is usually a laser beam L emitted from a laser oscillator 1, and a light modulator 2, a collimator lens 3 and a rotating polygon mirror 4 are arranged along the path of the laser beam L. An fθ lens 6, a reflection mirror 7 and a beam detector 8 are arranged between the rotating polygon mirror 4 and a rotating drum 5.

The laser beam L from the laser oscillator 1 is modulated by the light modulator 2 which is driven by an image signal N supplied from a frame memory 9 in which the image signal is stored, and the modulated laser beam L is main-scanned by the rotating polygon mirror 4 through the collimator lens 3 to form a record image P on a photo-sensitive film F on the rotating drum 5 through the fθ lens 6. A portion of the laser beam L outside of an effective area of the record image P, which is transmitted through the fθ lens 6 is reflected by the reflection mirror 7 and directed to the beam detector 8 to generate a horizontal synchronization signal.

In this image recording apparatus, it is necessary to wrap the photo-sensitive film F around the rotating drum 5 before recording of the image P and remove the photo-sensitive film F from the rotating drum 5 after recording of the image P. During these operations, the laser beam L is cut off by the light modulator 2 but the cut off is not perfect and a very weak light is emitted. If one area on the photo-sensitive film F is repeatedly scanned by such light as the rotating polygon mirror 4 and the rotating drum 5 rotate, light exposure occurs on the photo-sensitive film F, among others, in the record area.

In an ideal light modulator, the output is zero if the input is zero. In actuality, however, the laser beam L from the light modulator 2 is not perfectly cut off due to, for example, the deviation of the signal even if the input to the light modulator 2 is zero, and hence light exposure cannot be entirely prevented.

In order to resolve the above problem, it has been proposed to improve the wrapping and removing mechanism so that the photo-sensitive film F does not pass through the main scanning line. However, this method requires a complex wrapping and removing mechanism.

In another method, the rotation of the rotating polygon mirror 4 is stopped during the wrapping and removing operations to stop the main scan of the laser beam L, and the laser beam L is oriented in a direction so as not to expose the photo-sensitive film F. In this method, however, the control of the rotating polygon mirror 4 is complex. Further, since the rotation of the rotating polygon mirror 4 is started after the photo-sensitive film F has been set on the rotating drum 5, time is wasted before the rotation of the rotating polygon mirror 4 is stabilized.

It may be necessary to completely cease or temporarily interrupt the recording of the image, in addition to the wrapping and removing periods of the photo-sensitive film F. In such non-record mode, the photo-sensitive film F may be exposed. The temporary interruption occurs in the following case. A multiformat camera type image recording apparatus for recording a plurality of images on one photo-sensitive sheet has the frame memory 9 for temporarily storing the input images. If the frame memory has a capacity large enough to store all images to be recorded, there is no problem. However, in order to save cost and space, such a frame memory is usually not used but a frame memory having a capacity which can store only a portion of the images to be recorded is used. When the frame memory becomes full, the image input is inhibited and the images inputted are recorded, and then the image input is again accepted and recorded at an appropriate timing of the rotating drum. In this method, the recording of the image must be temporarily stopped during the writing of the image input into the frame memory. If the light is exposed to the photo-sensitive sheet, among others, to the record area during the interruption of the recording, a serious problem arises.

When the recording operation is resumed from the interruption state, the scanning light may be in the record area in the main scanning direction. In this case, an unnecessary line is created as will be explained later.

In a medical application for which the apparatuses of this type are frequently used, even a small exposure is an obstacle to making a correct decision based on the recorded image. Accordingly, an apparatus which can completely prevent the exposure is required.

SUMMARY OF THE INVENTION

It is an object of the present invention to provide an image recording apparatus which completely prevents light exposure of a recording medium in a non-recording mode.

It is another object of the present invention to provide an image recording apparatus which sets a timing to start horizontal recording by a horizontal synchronization signal during cut-off of a scanning light beam to prevent an unnecessary line from being drawn on a recording medium when the recording is resumed.

DESCRIPTION OF THE PREFERRED EMBODIMENTS

Figure 1:
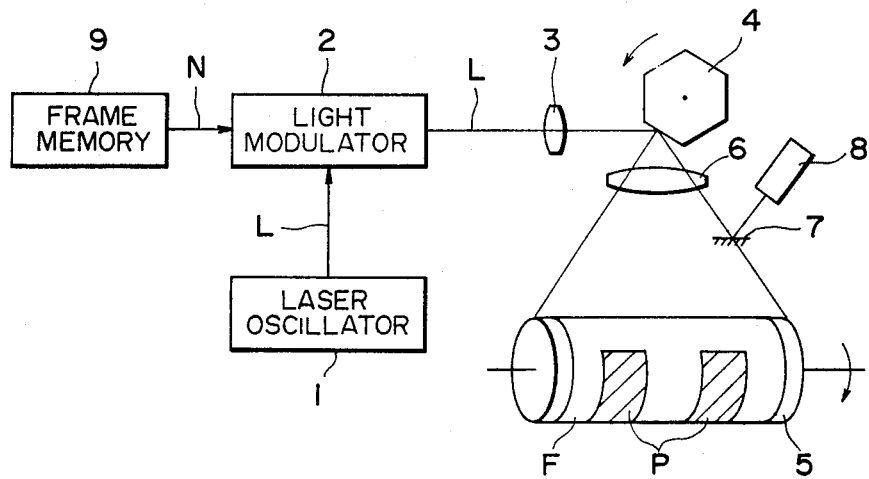
FIG. 1 shows a conventional apparatus.
Figure 2:
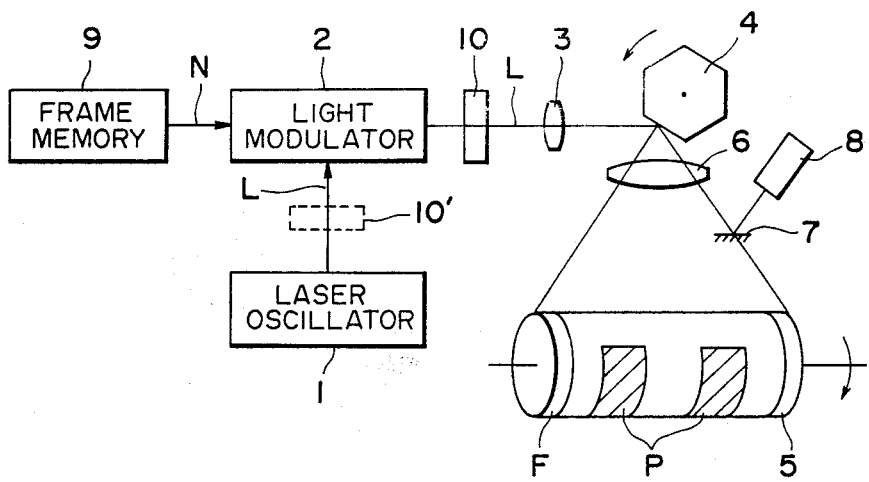
FIG. 2 shows one embodiment of an image recording apparatus of the present invention.

FIG. 2 shows one embodiment of the present invention. The like elements to those shown in FIG. 1 are designated by like numerals. A beam shutter 10 is arranged between the light modulator 2 and the collimator lens 3. In the present embodiment, the beam shutter 10 is a solenoid-actuated mechanical shutter.

The laser beam L applied to the light modulator 2, is modulated by the image signal N applied to the light modulator 2 from the frame memory 9, and mechanically shut on and off by the beam shutter 10. The laser beam L passed through the beam shutter 10 is collimated by the collimator lens 3 and reaches the rotating polygon mirror 4 by which it is repeatedly main-scanned at a constant speed in a direction normal to the direction of rotation of the rotating drum 5, and the beam is focused by the $f\theta$ lens 6 and reaches the rotating drum 5 so that the record image P is formed on the photo-sensing film F. A portion of the laser beam L is reflected by the reflection mirror 7 arranged between the $f\theta$ lens 6 and the rotating drum 5 and directed to the beam detector 8 to generate a horizontal synchronization signal, which is necessary to set a timing of recording. In order to produce a stable horizontal synchronization signal, a strong laser beam should be applied to the beam detector 8. Each time the laser beam is applied to the beam detector, a timer starts to count so that the strongest laser beam is emitted immediately before the laser beam is next applied to the beam detector 8.

Figure 3:
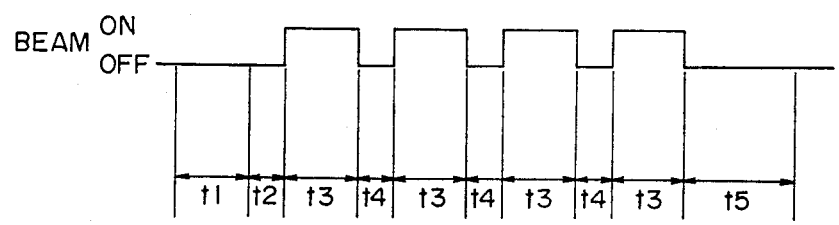
FIGS. 3 and 4 show timing charts for cutting off a beam.

FIG. 3 shows a shut-off timing of the laser beam L by the beam shutter 10. The abscissa represents time, and the beam shut-off is shown by a low level while the beam transmission is shown by a high level. The time axis includes a photo-sensitive film wrapping period t1 for wrapping the photo-sensitive film F around the rotating drum 5, an image memory writing period t2 for writing the image input into the memory, an image recording period t3 for reading out the data from the frame memory and recording it on the photo-sensitive film F, an image memory write period t4 for temporarily interrupting the recording of the image to the photo-sensitive film F and writing the image input into the memory, and a photo-sensitive film removal period t5 for removing the photo-sensitive film F from the rotating drum 5 after the recording of the image. The image is recorded by repeating the image recording period t3 and the image memory writing period t4. In the photo-sensitive film wrapping period t1, the image memory write period t4 and the photo-sensitive film removal period t5 other than the image recording period t3, the laser beam L is not necessary. Thus, the laser beam L is shut off by the beam shutter 10 to prevent light exposure.

The beam shutter 10 may be located at another position than the illustrated position provided it is located in the path of the laser beam L. For example, it may be located between the laser oscillator 1 and the light modulator 2. The means for driving the mechanical shutter of the beam shutter 10 is not limited to a solenoid. For example, the shutter may be opened and closed by a drive mechanism such as a motor. A liquid crystal having an electro-optical effect may be used as the beam shutter 10.

Figure 4:
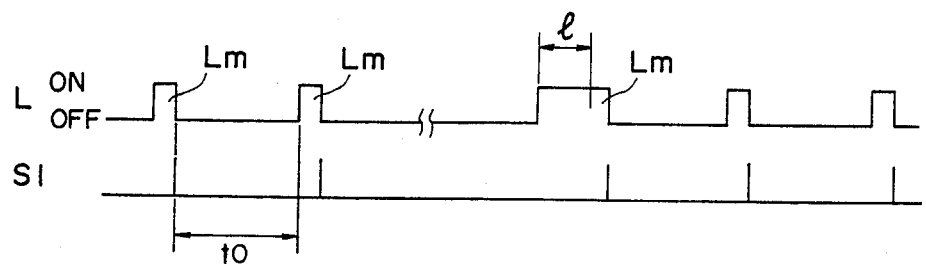

As described above, in the present apparatus, it is necessary to produce the horizontal synchronization signal by the beam detector 8 in order to set the timing of recording. As shown in FIG. 4, a strong laser beam Lm must be applied to the beam detector 8 in order to generate the stable horizontal synchronization signal. In order to prevent the strong laser beam Lm from being directed to the photo-sensitive film F, a timer (not shown) driven by a light beam detection signal S1 starts to count each time the laser beam L is applied to the beam detector 8, such as during a beam on period to shown in FIG. 4, so that the strongest laser beam Lm is emitted immediately before the laser beam L is next applied to the beam detector 8.

As described above, the image recording apparatus of this type has a frame memory (not shown) for temporarily storing the input image. If the frame memory has a capacity large enough to store all record images to be recorded on one photo-sensitive film F, its cost and required space increase. Usually, a frame memory having a capacity to store only a portion of the record images is used, and when the memory becomes full, the image information input is inhibited and the input image is recorded on the photo-sensitive film F, and then the image input is again accepted.

In this system, the image recording should be temporarily stopped during the writing of the image input into the frame memory. In FIG. 2, the beam shutter 10 is arranged on the path of the modulated laser beam L to shut off the laser beam L during times other than recording period. In this method, however, since the beam detection signal S1 is not produced during the beam shut-off, the synchronization is not attained. Thus, when the beam shutter 10 is next opened, the strong laser beam Lm is directed to the effective image area to produce an unnecessary line l as shown in FIGS. 4 and 5.

Figure 5:
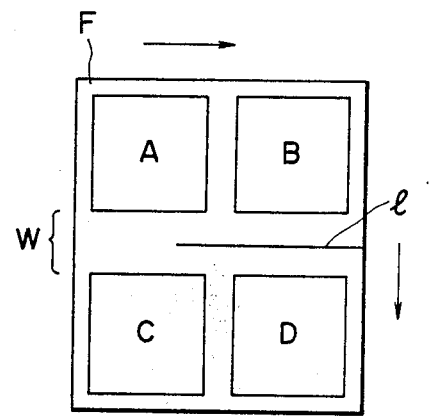
FIG. 5 illustrates an unnecessary line caused by a shift of timing at the start of recording.

As shown in FIG. 5, when image signals A and B are supplied to the frame memory and the image memory becomes full, the image input is inhibited and the recording is started. After the images A and B have been recorded on the photo-sensitive film F, the been shutter 10 is closed to shut off the laser beam L in order to prevent the light exposure of the blank area W. Then, signals C and D are supplied to the frame memory and the beam shutter 60 is opened to start the recording. In order to produce the stable light beam detection signal S1, the strong beam is used. Since timer is not in operation and the synchronization is not attained, the reflection angle of the rotating polygon mirror 4 to the laser beam L at the time when the beam shutter 10 is opened is not constant. If the beam shutter 10 is opened when the rotating polygon mirror 4 is at the mid-point of the main scanning, the strong laser beam Lm is emitted and the unnecessary line l is drawn on the photo-sensitive film F as shown in FIG. 5.

By providing the beam shutter 10 in the conventional apparatus, the light exposure can be completely prevented, but the unnecessary line appears on the photo-sensitive film F.

Figure 6:
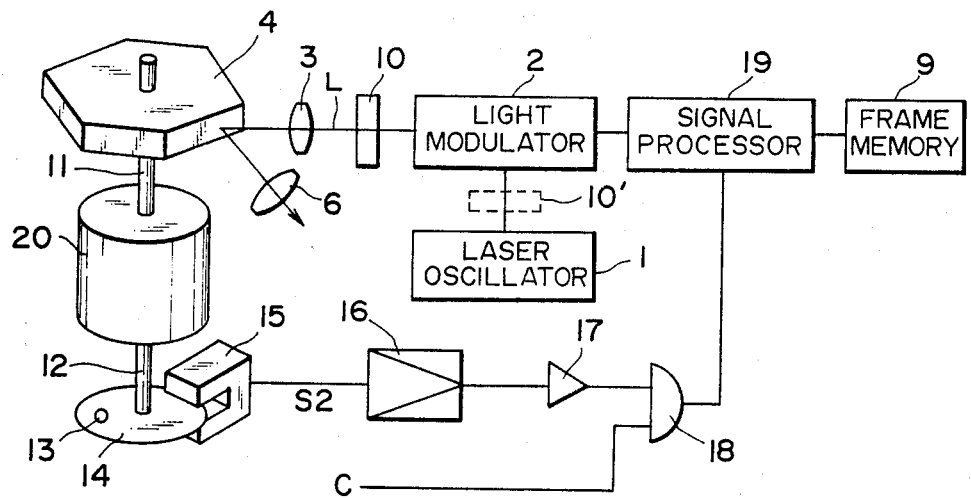
FIG. 6 shows synchronization signal generation means of the present invention.
Figure 7:
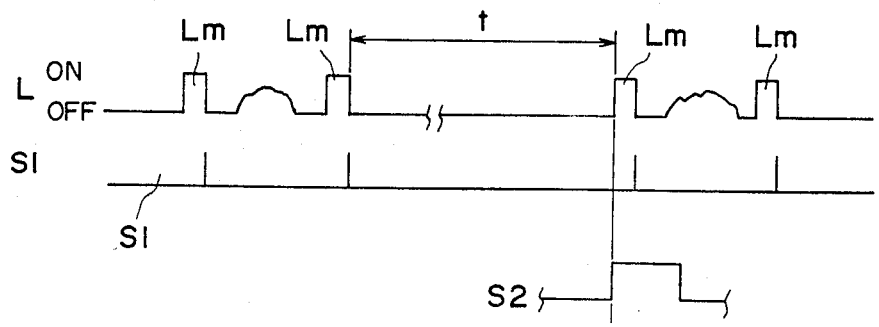
FIG. 7 shows a timing chart for cutting off a light beam.
Figure 8:
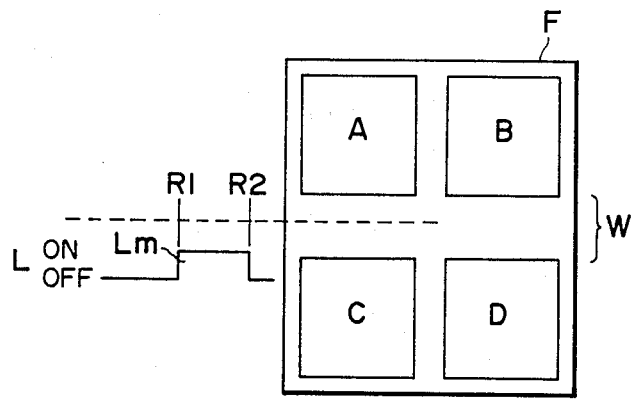
FIG. 8 shows a timing relationship of a photo-sensitive film and light beam cut off.

Referring to FIGS. 6 to 8, a horizontal signal generation system which prevents the unnecessary line from being formed will be explained.

FIG. 6 shows a configuration which is similar to that of FIG. 2 except for position detection means for the rotating polygon mirror 4 and input means to the light modulator 2. It also has the reflection mirror 7 and the beam detector 8, though they are not shown. The rotating polygon mirror 4 is driven by a motor 20 through a drive shaft 11, and a rotating disk 14 having an detection aperture 13 is attached to a rotating shaft 12 which rotates with the drive shaft 11 on the opposite side of the drive shaft 11. A photoelectric position detector 15 having a photoemitter and a photosensor is mounted near the rotating disk 14 and an output thereof is applied to a two-input AND gate 18 through an amplifier 16 and a buffer 17. A command signal C which indicates that the beam shutter 10 may be opened, that is, the frame memory 9 is full and the recording is enabled, is applied to the other input terminal of the two-input AND gate 18. The output of the two-input AND gate 18 is supplied to a signal processor 19, an output of which is connected to an input terminal of the light modulator 2 for the image signal N.

The arrangement is such that when the reflection angle of the rotating polygon mirror 4 to the laser beam L is at the position just before the beam detector 8 as shown in FIG. 2, the detection aperture 13 moves past the position detector 15, which produces the position detection signal S2.

Accordingly, when the record images A and B have been recorded, the laser beam L is shut off by the beam shutter 10, and when the record images C and D have been stored in the frame memory, the recording of the image is enabled. Thus, the command signal C is applied to one input terminal of the two-input AND gate 18. The command signal C may be generated by a data counter which generates the command signal C when the count reaches a predetermined value. On the other hand, the detection aperture 13 of the rotating disk 14 which is rotated with the rotating polygon mirror 4 passes through the position detector 15 when the reflection angle of the rotating polygon mirror 4 to the laser beam L is out of the effective image area and at the position just before the beam detector 8. The position detection signal S2 from the position detector 15 is applied to the two-input AND gate 18 at a constant rate through the amplifier 16 and the buffer 17.

In this manner, the two signals are independently applied to the two-input AND gate 18. When the AND gate 18 produces the output, the beam shutter 10 is opened, the light modulator 2 is activated and the beam intensity is enhanced. The signal processor 19 controls the input to the light modulator 2 which emits the modulated laser beam L, and the strongest laser beam Lm is applied to the beam detector 8 by the rotating polygon mirror 4. The timer is operated until the laser beam L is next shut off. Thus, the optimum timing for recording the image is obtained.

As shown in FIG. 7, the position detection signal S2 from the position detector 15 generated immediately before the light beam detection signal S1 is generated from the beam detector 8 coincides with the time at which the beam shut-off period t terminates and the laser beam L is turned on. Since the light beam detection signal S1 is produced immediately thereafter, the strong laser beam Lm is emitted from the position R1 which is immediately before the light beam detection signal S1 to the beam detection position R2 so that the spurious line is not drawn in the effective image area. After the beam has been detected by the beam detector 8, the beam intensity is lowered, and the beam is modulated by the image signal stored in the frame memory, and the beam intensity is increased again immediately before the beam detector 8 (see FIG. 7).

In the present embodiment, one detection aperture 13 is formed in the rotating disk 14 to detect the timing when the rotating polygon mirror 4 is at the predetermined angle. Accordingly, one rotation time of the rotating polygon mirror 4 is needed before two different signals coincide.

When the rotating polygon mirror 4 has n planes and the rotating disk 14 has m detection holes 13 ($1 < m \leq n$), the chance of coincidence of the two signals increases by a factor of m and the waiting time is reduced to 1/m. If the detection holes 13 are formed at positions which allow detection of the desired angles of the plurality of planes, the efficiency of recording is further improved.

In accordance with the present invention, the beam shutter is arranged in the path of the laser beam to completely prevent the light exposure to the photo-sensitive film, and the position at which the rotating polygon mirror reflects the laser beam immediately before the light beam detector is detected by the position detection means which is linked to the rotating polygon mirror. The beam shutter is opened when the position detection signal and the signal indicating that the beam shutter may be opened coincide. In this manner, the exposure-free image is produced and the unnecessary line due to the shift of the record start timing is prevented, and a high quality image is produced.

We claim:

1. An image recording apparatus comprising:
   a frame memory for storing image information as an image signal;
   a recording light source;
   a light modulator activated by the image signal in said frame memory in a recording mode for modulating a light emitted from said recording light source;
   light scanning means; and
   light beam shut-off means separate from said light modulator for shutting off the light from said recording light source in a non-recording mode.

2. An image recording apparatus according to claim 1 wherein said light beam shut-off means is a mechanical shutter.

3. An image recording apparatus according to claim 2 wherein said shutter is actuated by a solenoid.

4. An image recording apparatus according to claim 1 wherein said light beam shut-off means is a liquid crystal shutter.

5. An image recording apparatus according to claim 1 wherein said light beam shut-off means is arranged between said light modulator and said light scanning means.

6. An image recording apparatus according to claim 1 wherein said light beam shut-off means is arranged between said recording light source and said light modulator.

7. An image recording apparatus comprising:
   a frame memory for storing image information as an image signal;
   a recording light source;
   a light modulator activated by the image signal in said frame memory in a recording mode for modulating a light emitted from said recording light source;
   light scanning means;
   light beam shut-off means separate from said light modulator for shutting off the light from said recording light source in a non-recording mode; and
   a rotating drum having a recording medium mounted thereon circumferentially.

8. An image recording apparatus according to claim 7 wherein said frame memory has a capacity to store only a portion of all record images, and said rotating drum is rotated a plurality of revolutions to record all record images.

9. An image recording apparatus according to claim 7 wherein said light beam shut-off means is activated during the loading of said recording medium onto said rotating drum and the unloading thereof from said rotating drum.

10. An image recording apparatus according to claim 7 wherein said light beam shut-off means is activated during the writing of the image signal into said frame memory.

11. An image recording apparatus comprising:
- a frame memory for storing image information as an image signal;
- a recording light source;
- a light modulator activated by the image signal in said frame memory in a recording mode for modulating a light emitted from said recording light source;
- light scanning means;
- light beam shut-off means separate from said light modulator for shutting off the light from said recording light source in a non-recording mode;
- a photo-detector for detecting a scan light outside of an effective image area to produce a horizontal synchronization signal in the recording mode;
- position detection means for detecting a scanning position of said light scanning means in the non-recording mode; and
- control means for deactivating said light beam shut-off means and enabling said light modulator when writing of information into said frame memory is completed and the scanning position detected by said position detection means is outside of the effective image area.

12. An image recording apparatus according to claim 11 wherein said position detection means generates a detection signal at the scanning position immediately before said photo-detector.

13. An image recording apparatus according to claim 12 wherein the intensity of the scanning light is increased from the scanning position at which the detection signal is generated to the scanning position at said photo-detector.

14. An image recording apparatus according to claim 11 wherein said position detection means includes a rotating disk rotated with said light scanning means and a position detector arranged to face the rotating disk.

15. An image recording apparatus according to claim 14 wherein said light scanning means has a rotating polygon mirror, and said rotating disk has a plurality of apertures for producing outputs one for each of the planes of said rotating polygon mirror.

* * * * *

UNITED STATES PATENT AND TRADEMARK OFFICE
CERTIFICATE OF CORRECTION

PATENT NO. : 4,771,337

DATED : September 13, 1988

INVENTOR(S) : Endo, et al.

It is certified that error appears in the above-identified patent and that said Letters Patent is hereby corrected as shown below:

COLUMN 1

Line 43, "rotate," should read --rotates,--.

COLUMN 3

Line 3, "beam L" should read --beam L,--.

COLUMN 4

Line 36, "beam shutter 60" should read

--beam shutter 10--;

Line 38, "timer" should read --the timer--;

Line 39, "the" (first occurrence) should be deleted; and

Line 60, "an should read --a--.

Signed and Sealed this

Eighteenth Day of July, 1989

Attest:

DONALD J. QUIGG

Attesting Officer

Commissioner of Patents and Trademarks